United States Patent Office 3,345,288
Patented Oct. 3, 1967

3,345,288
PROCESS FOR DEWATERING ORGANIC SLUDGES
FROM WASTE WATER TREATMENT
Heinrich Sontheimer, Auf dem Seif 9,
Falkenstein, Germany
Filed Feb. 2, 1965, Ser. No. 429,710
Claims priority, application Germany, Feb. 4, 1964,
M 59,798
14 Claims. (Cl. 210—10)

ABSTRACT OF THE DISCLOSURE

A process for improving the dewaterability of organic sludges from waste water treatment which includes the steps of treating with lime, neutralizing with carbon dioxide to a pH below 10.0, thickening for a sufficient time, and thereafter mechanically dewatering. Additional steps of pre-thickening of the raw sludge; common thickening of the raw and limed sludge; deriving the $CO_2$ from either an aerobic or anaerobic step of treatment of the sludge; deriving the $CO_2$ from calcination of the dewatered sludge, and time and temperature control may be incorporated in the process.

---

This invention relates to the thickening and dewatering of the sludges of municipal or industrial waste water and more particularly to a method of treating liquid containing fine and colloidal solids resulting from a sludge dewatering step to improve its thickening and dewatering characteristics.

An object of this invention is to provide a method for improving the dewaterability of sludge prior to dewatering on a centrifuge, filter, or the like.

Another object of this invention is to provide a process for treating sludges wherein a high percentage of the solids contained in the sludge are removed in a highly dewatered form.

A specific object of the invention is to provide a method of removing solids from centrate from a centrifuge resulting from the dewatering of sludge by treatment with lime and carbon dioxide.

Other objects will become apparent upon consideration of the detailed description and claims which follow.

The term "raw sludge" as used herein denotes the sludge from a primary clarifier or that from a secondary clarifier following a biological treatment or a freshly settled sludge. The term "digested sludge" denotes anaerobically digested sludges. The term "centrate" refers to the liquid effluent containing fine and colloidal suspended solids resulting from a centrifuging process.

Sludges resulting from treatment of municipal sewage are normally decomposed in digesters and thereafter dewatered. Dewatering is usually accomplished on drying beds or by use of vacuum filters or centrifuges after addition of chemicals.

Dewatering on drying beds requires a large area, and dewatering by filtration or centrifuging after the addition of chemicals results in high operating costs. Standard decanting or scroll centrifuges produce a highly dewatered centrifuge discharge at low operating costs. However, such units have the disadvantage that they discharge only about 50 to 80 percent of the solids content of the raw sludge as cake, while the remaining 20 to 50 percent of the solids remain in the centrate. To further dewater the centrate numerous methods have been developed; however, these methods have limited application because, in addition to the centrifuge, another dewatering device is usually required. Also, these methods are not applicable to all sludges resulting from clarification installations.

Treatment of solutions with lime and carbon dioxide to obtain a relatively easily dewatered sludge is practiced in the sugar industry to treat sugar cane juice. It is particularly important in such a treatment to control the addition of $CO_2$ so that the alkalinity is not lowered too much. If the sludge pH falls below 10.0, filterability is lessened rather than improved. Surprisingly, it has been found that treatment with lime and carbon dioxide prior to filtration can also be extended to the complex organic sludges resulting from municipal and industrial wastes.

When this mode of operation was applied to centrate resulting from sludge dewatered by a decanting centrifuge, it was found that the centrate became easily dewaterable after treatment with lime and $CO_2$. Flow rates could be increased many times and the quantity of solids remaining in the centrate was appreciably decreased. In this way sludge could be entirely dewatered on a single centrifuge. Applicant's process basically comprises treating the centrate with lime, followed by neutralization of the centrate to a pH value below 10.0, preferably between 9.0 and 8.0, so that most of the lime remaining in solution is transformed into calcium carbonate. After such treatment the centrate can be thickened by sedimentation. Thickened sludge resulting from the sedimentation step is then combined with the raw sludge to be dewatered and introduced into the centrifuge. This mixture has 50 to 100 percent higher solids content than raw sludge alone, and the resulting centrifuge solids discharge is in a highly dewatered form.

This process is applicable to raw, digested, or mixed sludges, and the method is also suitable for treating industrial sludges, as, for example, sludges from paper mills. It is necessary to the proper operation of this method that centrate be extensively thickened after the treatment with lime and carbon dioxide.

Raw sludge to be dewatered is first thickened by simple sedimentation or flotation. The water removed is returned to a clarification basin. Thickened raw sludge is fed to a decanting centrifuge. The centrifuge usually removes 50 to 80 percent of the solids content of the raw sludge with a cake moisture of 40 to 60 percent. The centrate contains 20 to 50 percent of the solids content of the raw sludge and has a solids content of about 15 to 45 grams per liter.

According to the invention, centrate containing 20 to 50 percent of the original solids contained in the raw sludge is mixed with a quantity of either dry or aqueous $Ca(OH)_2$ slurry of at least 20 percent concentration. After good mixing the lime-containing centrate is treated in a reactor with carbon dioxide-containing gas and mechanically agitated until the pH value is below 10, in the range of 9.0 to 8.0. The mixture is then thickened by sedimentation, flotation, or by other well known methods. The resulting sludge has a solids content of about twice that of the centrate. This sludge is then mixed with incoming raw sludge to be dewatered and centrifuged to remove the suspended solids.

Thickening of centrate treated with lime and carbon dioxide and thickening of the raw sludge to be dewatered may be carried out together. The dewaterability of industrial sludge is particularly improved when both the raw sludge and centrate are treated with lime and $CO_2$. The thickener in such an arrangement must be sized correspondingly. Raw sludges consisting of primary sludge or mixed sludges containing a relatively high proportion of primary sludges are difficult to centrifuge with efficiency; therefore, a large recycle or a relatively great lime addition is necessary in order to obtain good solids recovery in the centrifuge.

Raw sludges when treated in this manner with hot off-gases for neutralization are heated from 60° to 80° C., whereby some sterilization of the raw sludge is achieved. The dewatered sludge may be composted with no health objections and digestion in the thickening process will be prevented.

It was found that the gas necessary to neutralize the lime treated centrate could be any gas containing carbon dioxide, for instance, combustion off-gases. It was also found that the carbon dioxide necessary to neutralize the lime treated centrate could in some systems be produced within the system itself. It is well known that carbon dioxide is produced in the aerobic or anaerobic digestion of sludge. This carbon dioxide, present in statu nascendi, can be used as a neutralizer. If the invention is carried out in conjunction with an aerobic sludge treatment, lime can be added to the centrate and after a sufficient holding time, which depends on the characteristics of the sludge, introduced into the digester. The carbon dioxide-containing digester gas not yet combined in statu nascendi with the lime-containing centrate can be further utilized by recirculating the digester gas to the digester so that the contact time is increased. Most standard sludge digestors are equipped for such an operation.

The digested sludge and the treated centrate can then be thickened with lime addition. The centrate containing lime can be added directly to the digester.

The digesters must, of course, be sized to accommodate the additional capacity. Should the capacity of the digestors not be sufficient for the additional centrate capacity, a portion of the raw sludge may be centrifuged directly without digestion.

If the carbon dioxide from the digestion is not sufficient for neutralization, provision may be made for additional introduction of carbon dioxide, such as off-gas. Thus, partial neutralization preferably occurs prior to introduction of the lime-carrying centrate into the digester and can be achieved with very good efficiency owing to the high excess alkalinity. The treatment with off-gases also helps to maintain the temperature of the sludge in the digester, which should be about 35° for optimum digestion.

If the above method is practiced with an aerobic sludge treatment system, the lime treated centrate can be introduced separately into an aeration tank or in the activated sludge installation for the sewage. In the latter case the aeration area of the activated sludge treatment tank must be sized accordingly.

It is especially important that sufficient reaction time be allowed after treatment with lime. The amount of lime required can be reduced by a greater retention time. A reaction time of 30 minutes is usually not sufficient and some sludges will require more than 24 hours to completely react.

Which of the arrangements preferred can be determined experimentally in each case by considering such factors as the amount of the solid matter contained in the raw sludge that carries over into centrate. A raw sludge which undergoes dewatering simply and easily will reach a high solids content in the thickener and centrifuge into a highly dewatered cake and a relatively small quantity of centrate containing a low concentration of solids. Such a centrate can be treated with lime and carbon dioxide and thickened separately. The thickened sludge can be combined with the raw sludge, thickened, and centrifuged.

Centrate and raw sludge may also be separately treated with lime and carbon dioxide and thereafter thickened and centrifuged simultaneously with raw sludge. Raw sludge may, prior to thickening, be treated with lime in a known manner to improve the thickening. As a rule, however, it will be possible to improve the dewatering characteristics by simultaneous treatment of the raw sludge and centrate with lime and carbon dioxide.

If combining centrate with raw sludge and simultaneously treating them with lime and carbon dioxide is found disadvantageous, it may be preferable to combine only a part of the sludge from treated centrate with raw sludge. The remaining sludge may be treated by filtration, centrifugation, or on drying beds.

An installation for sludge incineration, which is indispensable for handling the large quantities of sludge, can be operated to provide lime and $CO_2$ necessary for treatment of the centrate. Lime for the method of the invention is recovered by calcining the ash residue wholly or partly to burned lime. Lime and carbon dioxide can be recovered from the dust-containing combustion gases.

It has further been found that thickening of centrate or a mixture with raw sludge can be greatly improved when the treatment with carbon dioxide and the thickening occur at an elevated temperature, for example, in the range of 40° to 70° C. If the cargo dioxide necessary for the treatment of centrate is produced by the combustion of an oil or gas, the temperature of the off-gas entering the treatment zone will usually be sufficient for heating. For heating the thickener, well known heating arrangement may be employed.

The layout of the plant remains basically unchanged regardless of the specific process used. A centrifuge, lime mixer, reactor for carbon dioxide treatment, and thickener are required. The treatment of the carbon dioxide and the subsequent thickening may take place in already existing process units of the sewage treatment plant.

The invention will be more readily understood by reference to the drawings wherein like reference characters designate similar elements and wherein.

Figure 1:
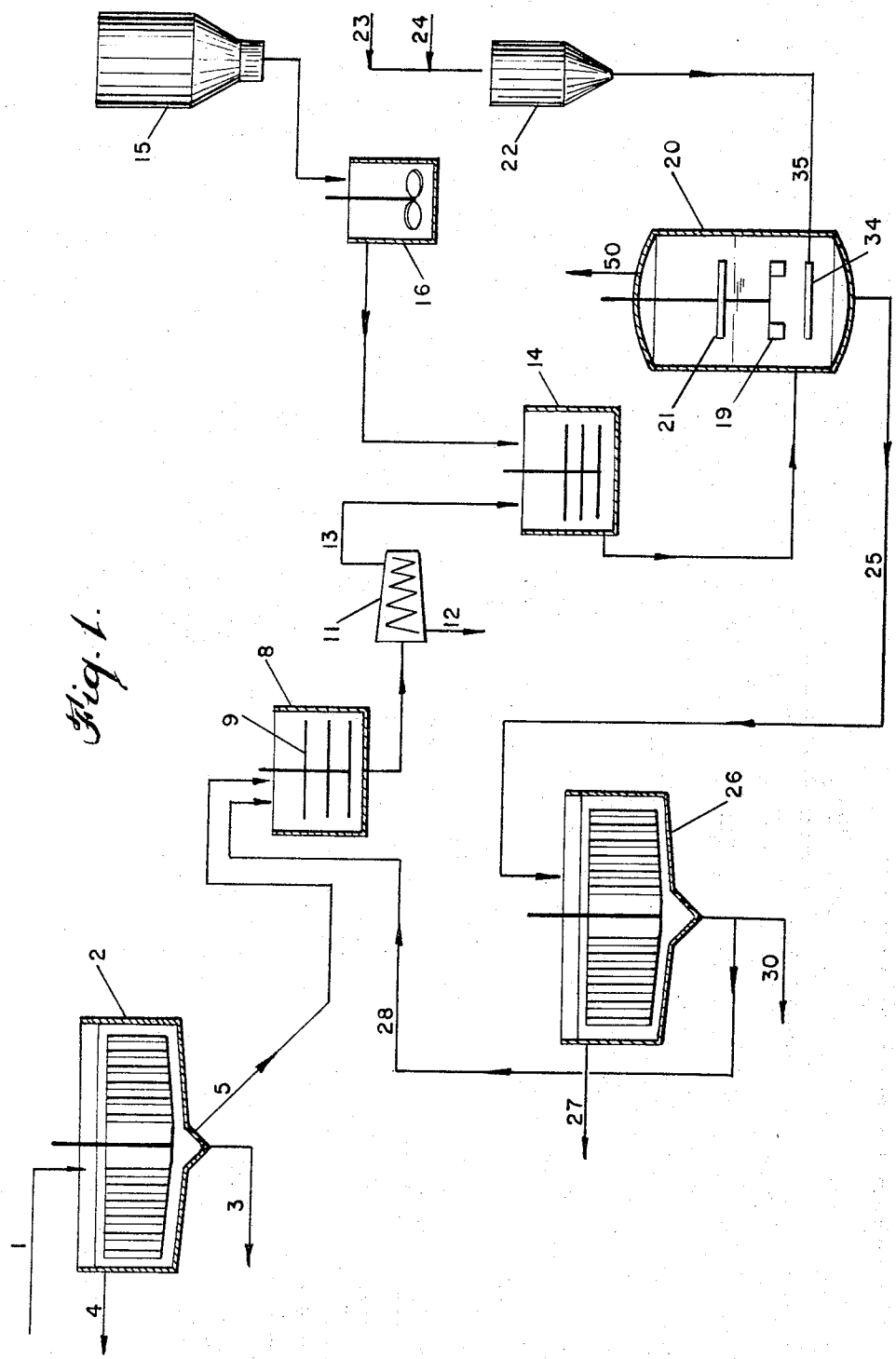
FIGURE 1 shows a flow diagram of an installation with two thickeners.

In the installation of FIGURE 1 sludge to be dewatered is fed through line 1 into thickener 2, which may be for intermediate storage when the raw sludge is already sufficiently dewatered. The water separated from the sludge in thickener 2 is returned through line 4 to the clarifying installation, not shown. Any sand or grit present in the sludge is removed by line 3 from the sump of the thickener and returned to the sand trap of the clarifying installation.

Thickened sludge is conducted from thickener 2 through line 5 to mixing container 8. In mixer 8 raw sludge is mixed by agitator 9 along with sludge recycled from thickening of the treated centrate. The mixture is conveyed to decanting centrifuge 11 where separation of 50 to 80 percent of the solids is usually attained. The solids or cake are discharged from the centrifuge at discharge 12 and usually have a solid-matter content between 40 and 50 percent and are storable or suitable for incineration. The centrate is conducted through line 13 into lime mixer 14, where it is stirred with milk of lime. The quantity of milk of lime added is between 10 to 40 kg. of Ca(OH)₂ per cubic meter sludge, depending on the makeup of the sludge and the reaction time.

Milk of lime is produced from burned lime, which is dosed by dry-dosing device 15 into slaking vessel 16, where enough water is added so that a temperature of 60° to 80° is maintained therein. The aqueous lime suspension is proportionally fed into mixer 14.

Centrate pretreated with lime is then conducted through line 17 to reactor 20. High speed rotor 19 within the reactor brings about an intimate mixing of the contents and disperses the carbon dioxide-containing gas entering from distributor 34 into bubbles. Any foam which may have formed on the liquid surface is collapsed by foam breaker 21 which rotates above the sludge surface. The carbon dioxide-containing off-gas used to treat the centrate is produced in oil burner 22 and carried to the reactor by line 35. Fuel line 23 and air line 24 are connected to the burner. Temperatures within line 35 are maintained below 700° C. by controlling the air and fuel ratio or by water quenching the combustion products. The carbon dioxide in the off-gas reacts with the calcium hydroxide to form calcium carbonate. This reaction lowers the pH value of the lime-containing centrate to below 10.0, approximately between 8.0 and 9.0. The pH value may be controlled by dilution of the off-gas with air or by regulating the distribution of the off-gas in the centrate by varying the peripheral speed of the rotor and the off-gas production.

Carbon dioxide containing gas may also be produced by means of a submerged burner within the reactor employing oil or other suitable fuels such as digester gas. For transforming calcium hydroxide to calcium carbonate any gas which contains at least 5 percent by volume of carbon dioxide can be used, for example, exhaust gases from combustion installations for sludge or garbage. Digester gas, which usually contains about 30 percent by volume of $CO_2$, may also be used. A further benefit results as the digester gas is purified in the process. When a sludge dewatered according to the method of the invention is incinerated, carbon dioxide can be recovered by calcining the calcium carbonate-containing ash.

Centrate treated in the reactor with lime and carbon dioxide then is carried through line 25 to thickener 26 in which, after about 24 hours of total retention time, extensive thickening occurs. The clarified water, which usually contains less than 0.5 gram/liter of solid matter, is conducted through line 27 back to the clarifying installation. The solid-matter content of the clarified water can be further reduced by dosing iron sulphate into the inflow of the thickener. Only 1 to 2 grams of iron sulphate per cubic meter of centrate gives excellent clarification, with a resulting water practically free of solid matter suitable for discharge into a river or stream. The thickened sediment of the centrate is conveyed through line 28 to mixing container 8, where it is mixed with the thickened sludge. A part of the thickened sediment may be branched off through line 30, dewatered on a filter in known manner, and disposed of.

Figure 2:
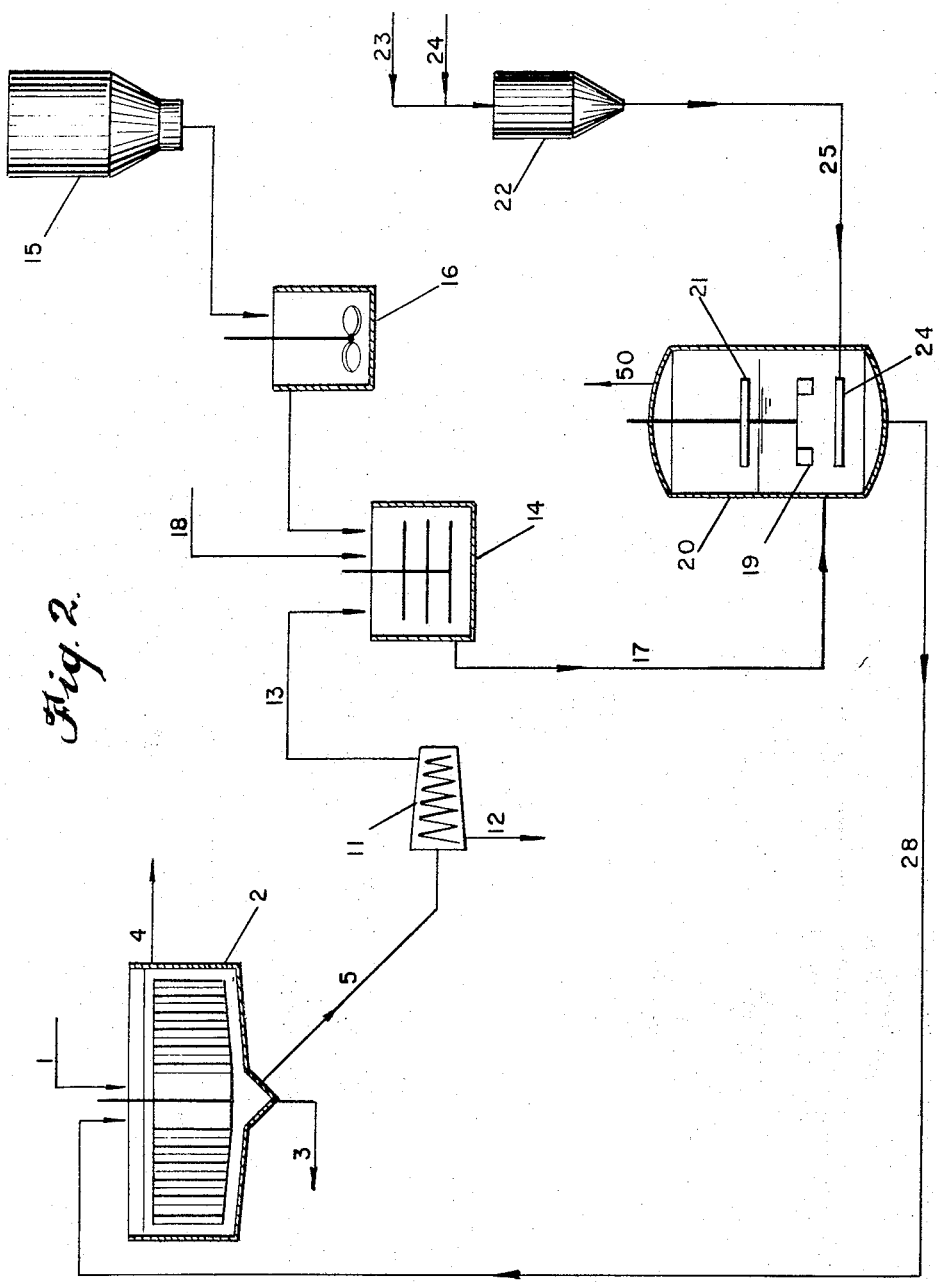
FIGURE 2 is a flow diagram of an installation with one thickener.

FIGURE 2 shows a system according to the invention with only one thickener.

In this embodiment, sludge to be dewatered is fed into lime mixer 14 or thickener 2 or at both places through inlets 1 and 18. Thickened sediment is carried from thickener 2 by conduit 5 to the centrifuge 11. The centrifuge discharge is indicated at 12. Centrate is added, through line 13, to the lime mixer 14 where slaked lime,

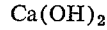

Ca(OH)₂ produced in container 16 by mixing burned lime from container 15 and water, is added. The mixture of centrate and slaked lime from lime mixer 14 is carried by line 17 to the reactor 20. Carbon dioxide-containing gas is produced in combustion chamber 22 by the combustion of a measured quantity of oil (line 23) with a measured quantity of air (line 24). The combustion off-gas is introduced into the reactor by line 25 and dispersed through distributor 24.

Reactor 20 is provided with agitator 19 whose rotor is disposed below the sludge surface but above distributor 24. The rotor causes an intermixing of the reactor contents and a fine-bubbled dispersion of the $CO_2$ containing off-gas. Blade 21 is located above the sludge surface for collapsing the foam. Exhaust air is conducted out of the reactor through line 50.

Centrate treated with lime and carbon dioxide is conducted through line 25 back to thickener 2. From the latter clarified water is removed from an overflow launder by line 4 and may be conducted back to the clarifying installation.

In this system easily dewaterable digested sludge may be delivered through 1 to thickener 2, while hard to dewater fresh sludge is fed to lime mixer 14 by conduit 18.

Figure 3:
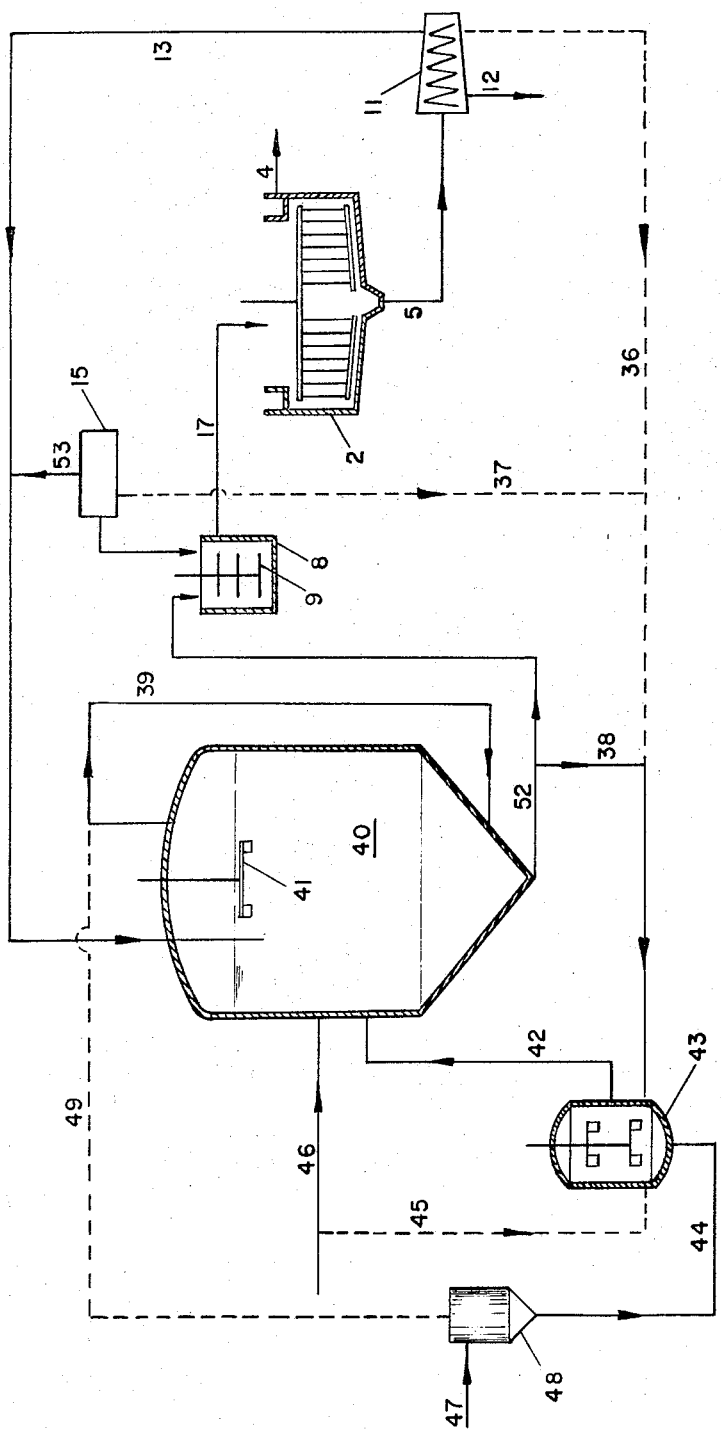
FIGURE 3 shows the flow diagram of an installation in connection with an anaerobic sludge treatment.

In the installation of FIGURE 3 the carbon dioxide is produced by anaerobic sludge digestion.

Raw sludge is fed through line 46 to the digester 40. The digester is equipped with agitation means for the digester gas consisting of line 39 in which a blower is installed. To avoid forming of scum caused by recirculation of the digester gas, rotor 41 is provided in the digester to rotate at the liquid surface. Digested sludge is removed from the digester through line 52 to the mixing chamber 8 where lime is added in the form of a suspension of calcium hydroxide from chamber 15. The lime-containing digested sludge is introduced through line 17 into thickener 2. The clarified effluent is removed from the thickener by line 4. The thickened and lime-containing digested sludge is delivered through line 5 to centrifuge 11 where it is dewatered. The dewatered sludge is discharged with a water content of 25 to 50 percent at discharge 12.

Centrate is brought back in line 13 to the digester and an additional dosage of lime is added by line 53. The carbon dioxide treatment occurs in the digester due to the gas produced in the digestion process. The centrate may also, after addition of lime, be introduced by line 37 to the neutralizing chamber 43 to be partially neutralized with off-gases. The off-gas can be produced from combustion of digester gas removed by line 49 to combustion chamber 48. Air is supplied at 47. The combustion off-gas is discharged into chamber 43 by line 44. This results in a heating of the centrate to about the optimum digestion temperature. The partially neutralized lime-containing centrate is reintroduced through line 42 into the digester. The neutralizing chamber 43 can also be used for maintaining a stable temperature in the digester by recirculation through lines 38, 36, and 42 of a partial flow of digested sludge. Raw sludge, before introduction in the digester, may also be heated by feeding it through line 45, into the chamber 43, and from there through line 42 to the digester. In this instance, the dosage of lime added through line 37 can be increased, especially with sludges which tend toward acid fermentation.

Figure 4:
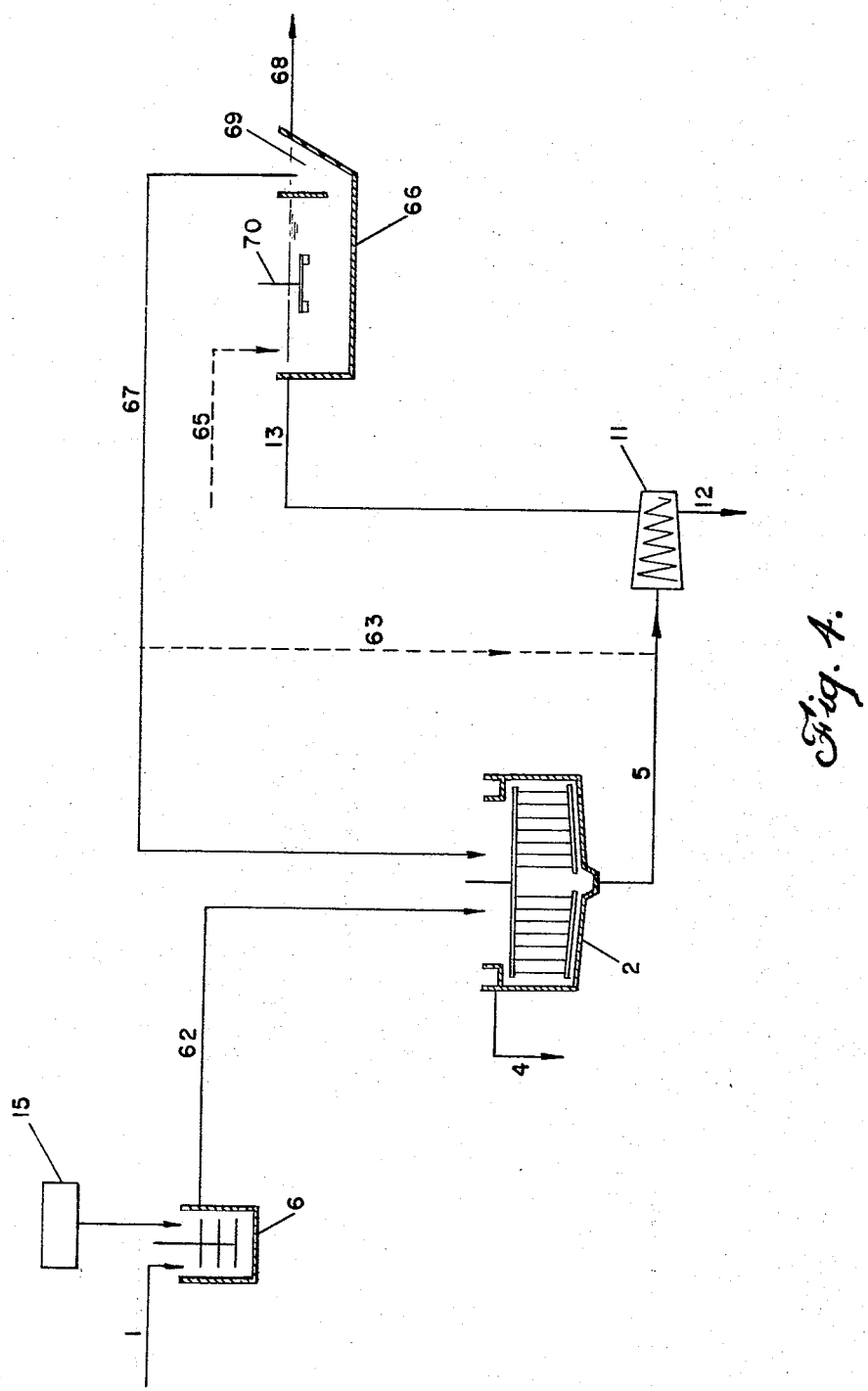
FIGURE 4 shows the flow diagram of an installation where carbon dioxide in connection with an aerobic sludge treatment is treated.

In the method according to FIGURE 4, treatment is in conjunction with aerobic activated sludge process. Raw sludge enters mixing chamber 6 through line 1 and is mixed with lime from chemical feeder 15. The calcium containing sludge is carried by line 62 to thickener 2 where sedimentation and further reaction with the lime occurs. The effluent is withdrawn at 4 and thickened sludge is brought by line 5 to centrifuge 11. Dewatered sludge is discharged through discharge 12 and the centrate is carried by line 13 to the activated sludge plant 66 equipped with clarification chamber 69. In the activated sludge plant aerobic decomposition aided by aerator 70 takes place and carbon dioxide is produced to cause neutralization of the lime. Effluent is removed through line 68. Untreated water is brought into the aeration unit by line 65. Neutralized centrate is carried through line 67 to the thickener or through line 63 directly to the centrifuge.

As the flow diagram reveals, the aeration tank can be a special unit for the treatment of the centrate or an already existing activated sludge treatment plant. In any case, the fundamental steps of the invention, namely, the treatment of the centrate with lime and subsequent carbon dioxide treatment, remain the same.

Example 1

One cubic meter of digested sludge with a solid matter-content of 52 grams/liter was centrifuged in a decanting centrifuge resulting in a solids separation of 57%. The centrate had a solid matter-content of 22 grams/liter. 20 grams/liter of $Ca(OH)_2$ was added to this centrate, and a reaction time of 30 minutes was allowed. This was followed by neutralization of the mixtures with $CO_2$ containing off-gases. The resulting solids in the centrate increased to 44 grams/liter. The treated centrate was then thickened by sedimentation and the solid matter-content attained after a 24 hour holding period was 98 grams/liter. Accordingly, 1 cubic meter of raw sludge yielded 0.4 cubic meter of thickened centrate, and the latter, together with raw sludge, was conducted to the centrifuge. The separation degree of the centrifuge remained constant at about 57 to 58 percent, and the solid matter-content of the centrifuge discharge was about 50 percent. Equilibrium was established after 0.7 cubic meter of the centrate per cubic meter of raw sludge, thickened and treated according to the invention, was returned to the centrifuge. From the 1.7 cubic meters of centrifuge discharge there resulted a centrate quantity of about 1.5 cubic meters.

Investigations have shown that the solid matter increase through this reaction is related to the quantity of calcium hydroxide added, although most of the lime present at the end of the reaction is in the form of $CaCO_3$. This is probably due to the partial formation of organic calcium compounds as well as by the entering into solution of calcium carbonate as calcium bicarbonate. In addition to the 52 kg. of solid matter in the raw sludge, there were 30 kg. of calcium-compounds in the centrifuge discharge, and hence a total of 82 kg. of solid matter. At a total solid matter-content of 50 percent the centrifuge discharge contained, per kg. of solid matter in the raw sludge, 1.58 kg. of water. In comparison, this value is normally 2.2 to 2.5 kg. of water per kg. of sludge-solid matter in the filter-cake for filtration employing iron chloride and lime. Thus there is much less water to be evaporated in incineration of sludge treated according to the invention than sludges from ordinary filtration. This, of course, is important to the economy of the incineration process.

It has been found suitable to fix the retention time for the prereaction with the calcium hydroxide at about 30 minutes. The $Ca(OH)_2$ is added in a finely-suspended form as milk of lime. Neutralization with the carbon dioxide-containing gas requires about the same time and is carried out in a container, in which the stirrer breaks up the $CO_2$ gas and causes turbulence. This turbulence aids the formation of dense flocs which thicken well. For neutralization, a quantity of $CO_2$ which corresponds approximately to the stoichiometric quantity for transforming the added quantity of $Ca(OH)_2$ to $CaCO_3$ is necessary. $CO_2$ containing off-gas from combustion of oil was used in this case. The heat liberated caused a temperature rise of about 45° C., so that in the reaction container a 20° C. centrate was heated to an end temperature of 65° C. This temperature was sufficient for extensive disinfection, and also aided in the subsequent sedimentation.

Instead of combustion with oil, off-gas from the sludge-burning installation may also be employed. This gas contains carbon dioxide as a product of combustion of the organic matter and the $CO_2$ liberated from the $CaCO_3$. The quantity of $CO_2$ available in the off-gas is usually sufficient to sufficiently neutralize the sludge. When the combustion temperature is maintained high enough that the calcium carbonate is transformed to calcium oxide, a part of the lime necessary for the reaction can be recovered from the ash. In this method the ash containing lime is scrubbed in a venturi scrubber, and the temperature is thereby reduced to 60° to 80° C. accompanied by a slaking of the lime. Classification of the resulting ash and lime slurry in a hydrocyclone removes the solid matter in suspension and the inactive ash components, while lime is recovered. As a rule 50 to 80 percent of the lime can be economized in this way reducing treatment costs.

Example 2

A fresh raw sludge having a high percentage of industrial sludge, specifically $Fe(OH)_3$ and a solids matter content of 60 grams/liter was centrifuged in a decanting centrifuge and 45 percent of the solids were removed. To obtain extensive thickening it was necessary to add 30 to 40 grams of lime per liter of centrate. The quantity of sludge recycled to the centrifuge became relatively high and the centrate volume was 220 percent of the raw sludge volume.

Comparatively, the treatment of the raw sludge and centrate was carried out simultaneously. Raw sludge was added directly into the circuit in the lime reaction tank where 20 grams/liter of lime per liter of raw sludge was added. This was followed by neutralization to a pH of 8.85. The raw sludge was then thickened within 12 hours to about 12 percent solids and the separation degree in the decanting centrifuge rose from 45 to 70 percent at the same throughput. The calcium hydroxide addition necessary for a satisfactory recycle was reduced from 66 grams/liter, based on the raw sludge volume, to 35 grams/liter. The inflow to the centrifuge, including the recycled sludge, was only 100 to 120 percent of the raw sludge quantity. During neutralization with carbon dioxide containing off-gas from combustion of oil the centrate was heated to 60° C. In this way, although partially digested sludge was added, digestion in the thickener was wholly prevented. The temperature during thickening, due to the good insulation of the thickener, decreased only about 10° to 20° C. The centrifuge discharge had a solid-matter content of 48 percent and was composted and an odorless and scatterable, crumbly end product was attained. Digestion was not necessary in this mode of operation.

Example 3

Raw sludge with a 6 percent solids content was digested in a digester designed for a digesting period of 40 days.

The digester's contents were mixed by recirculated digester gas diverted from the discharge pipe and reintroduced into the lower end of the digester.

The digester was maintained at a temperature of 35° C. by recirculating a part of the digesting sludge from the digester through a direct heat exchanger and back to the digester. In the direct heat exchanger the sludge came in contact with hot off-gases produced by combustion of digester gas. The solids content of the sludge increased to 8 percent when the digester supernatant was removed. The supernatant was then mixed with 20 grams/liter of calcium hydroxide fed as a lime slurry.

The resulting mixture was thickened for a sufficient holding time to allow final reaction with the lime. The clarified liquid was removed from the thickener to the clarifier and the thickened lime-containing sludge had a solids content of 12 percent. This sludge was centrifuged in a decanting centrifuge with a separation degree of 65 percent. The discharge had a solids content of 35 percent. The centrate, containing 35 percent of the solids coming from the thickener, was introduced into the direct heat exchanger and combined therein with the recirculating digesting sludge.

The heating of the raw sludge directly affected the reaction time required with the carbon dioxide and off-gas. The introduction of the off-gas into the direct heat exchanger was controlled to maintain the digester temperature at 35° C. and pH at 8.0 to 8.5. The pH was 9.5 to 10 in the heat exchanger itself.

Since the carbon dioxide produced in the digestion process was utilized to neutralize the lime, the digester gas resulting from the digester contained only 3 to 10 percent by volume of carbon dioxide, as contrasted to about 30 percent normally.

The dewatered sludge discharge in this method of the invention was continuous and the product was crumbly and had a solids content of at least 35 percent by weight.

I claim:
1. In a process for dewatering organic sludges from the treatment of waste water wherein sludge is first thickened into a heavy sludge fraction followed by dewatering of the heavy sludge fraction on a mechanical dewatering device into a highly dewatered solids portion and a liquid containing fine and colloidal solids, the improvement comprising:
   (a) adding lime to said liquid containing fine and colloidal solids;
   (b) neutralizing the lime treated liquid with carbon dioxide until a pH value below 10.0 is reached;
   (c) thickening for a sufficient holding time the lime and carbon dioxide treated liquid into a supernatant substantially free of suspended solids and a thickened sediment;
   (d) separately withdrawing said supernatant liquid and said thickened sediment; and
   (e) returning the thickened sediment from the lime and neutralized carbon dioxide treated liquid to the mechanical dewatering step to be dewatered along with the sludge fraction from the first thickening step.

2. A process according to claim 1 wherein flocculation agents are introduced into the lime and carbon dioxide treated liquid prior to thickening.

3. A process according to claim 1 wherein thickening of the lime and carbon dioxide containing liquid occurs at a temperature of 60° to 80° C.

4. A process according to claim 1 wherein a portion of thickened sediment is returned to the mechanical dewatering step and a portion of the sediment is taken to disposal.

5. A process according to claim 1 wherein the thickening period of the lime and $CO_2$ treated liquid is at least 24 hours.

6. A process for dewatering organic sludges from the treatment of waste water comprising:
   (a) thickening a first quantity of sludge to be dewatered into a lower settled thickened sludge portion and an upper liquid portion with a low solids content;
   (b) removing the upper liquid portion;
   (c) mechanically dewatering the lower settled sludge into a highly dewatered solids portion and a sludge-water mixture containing fine and colloidal solids;
   (d) disposing of the dewatered solids portion;
   (e) adding lime to the sludge-water mixture resulting from the mechanical dewatering step;
   (f) adding a second quantity of sludge to the lime treated sludge-water mixture under mild agitation;
   (g) neutralizing the lime treated sludge-water and sludge mixture until a pH value below 10.0 is reached;
   (h) thickening the lime treated and neutralized sludge-water and sludge mixture into a lower settled treated sludge portion and an upper water portion with a low solids content;
   (i) removing the upper water portions; and
   (j) recycling the lower settled treated sludge to be thickened with the first portion of sludge to be treated.

7. A process for dewatering organic sludges from the treatment of waste water comprising:
   (a) thickening the sludge into a heavy sludge fraction and a supernatant substantially free of suspended solids;
   (b) centrifuging heavy sludge fraction into a highly dewatered solids discharge and a centrate containing only fine and colloidal solids;
   (c) treating the centrate with lime;
   (d) neutralizing the lime treated centrate until a pH value below 10.0 is reached;
   (e) thickening the neutralized centrate into a clarified liquid and a thickened sediment;
   (f) separately withdrawing said clarified liquid and said thickened sediment; and
   (g) returning the thickened sediment to said mechanical dewatering step to be dewatered with the heavy sludge fraction resulting from thickening the sludge.

8. A process according to claim 7 wherein the lime necessary to treat the centrate and the carbon dioxide for neutralization of the centrate is supplied by incinerating the highly dewatered solids discharge resulting from the centrifuging step into lime containing ash and $CO_2$ containing off-gases.

9. A process according to claim 7 wherein the steps of thickening of the sludge into a heavy sludge fraction and a supernatant and thickening of the neutralized centrate occur together.

10. A process for dewatering organic sludges from the treatment of waste water comprising:
   (a) thickening a first quantity of sludge to be dewatered into a settled thickened sludge portion and an upper liquid portion with a low solids content;
   (b) removing the upper liquid portion;
   (c) centrifuging the settled thickened sludge into a highly dewatered solids discharge and a centrate containing only fine and colloidal solids;
   (d) disposing of the dewatered solids discharge;
   (e) treating the centrate with lime;
   (f) adding a second quantity of sludge to the lime treated sludge-water mixture under mild agitation;
   (g) neutralizing the lime treated centrate and sludge mixture until a pH value below 10.0 is reached;
   (h) thickening the lime treated and neutralized centrate and sludge mixture into a lower settled sludge and an upper water portion;
   (i) removing the upper water portion; and
   (j) recycling the lower settled sludge to the mechanical dewatering step to be dewatered simultaneously with the settled sludge from said first quantity of sludge.

11. A process according to claim 10 wherein thickening the lime treated and neutralized centrate and thickening the first quantity of sludge all occurs simultaneously.

12. A process for treating organic sludges from the treatment of waste water comprising:
   (a) mixing lime with the sludge to be treated;
   (b) neutralizing the lime and sludge mixture with $CO_2$ to a pH below 10, said $CO_2$ being derived at least in part by anaerobically digesting the sludge;
   (c) thickening the resulting mixture for a sufficient period of time to settle out a lower sludge fraction from the upper water portion and to allow the reaction to proceed;
   (d) removing the lower sludge fraction to a dewatering device which separates the sludge into a highly dewatered solids discharge and a liquid discharge containing only fine and colloidal solids; and
   (e) recycling the liquid discharge to be mixed with the lime and sludge to be treated.

13. A process according to claim 12 wherein the raw sludge undergoing anaerobic digestion is partially neutralized and heated by treatment with $CO_2$ containing off-gases.

14. A process for treating organic sludges from the treatment of waste water comprising:
   (a) mixing lime with the sludge to be treated;

(b) neutralizing the lime and sludge mixture with $CO_2$ to a pH below 10, said $CO_2$ being derived at least in part by aerobically treating the sludge;

(c) thickening the resulting mixture for a sufficient period of time to settle out a lower sludge fraction from the upper water portion and to allow the reaction to proceed;

(d) removing the lower sludge fraction to a dewatering device which separates the sludge into a highly dewatered solids discharge and a liquid discharge containing only fine and colloidal solids; and (e) recycling the liquid discharge to be mixed with the lime and sludge to be treated.

References Cited

UNITED STATES PATENTS 2,774,693  12/1956  Brieghel-Muller _____ 127—50
3,168,419  2/1965  Gale _____ 127—50

OTHER REFERENCES

Spencer, G. L., et al., Cane Sugar Handbook, Eighth Edition, 1945, John Wiley, New York, pp. 69, 70, and 115–117 relied on.

MORRIS O. WOLK, *Primary Examiner.*

MICHAEL E. ROGERS, *Examiner.*